INVENTOR.
EDWARD MEYER
ATTORNEY

INVENTOR.
EDWARD MEYER

BY Donald R. Castle

ATTORNEY

INVENTOR.
EDWARD MEYER
BY
ATTORNEY

*INVENTOR.*
EDWARD MEYER
BY Donald R. Castle
ATTORNEY

INVENTOR.
EDWARD MEYER
BY
Donald R. Castle
ATTORNEY

United States Patent Office 3,669,715
Patented June 13, 1972

---

3,669,715
METHOD OF PREPARING A METAL PART TO BE SEALED IN A GLASS-CERAMIC COMPOSITE
Edward Meyer, Russell, Pa., assignor to Sylvania Electric Products Inc.
Original application Sept. 20, 1968, Ser. No. 761,164. Divided and this application June 17, 1970, Ser. No. 46,883
Int. Cl. B32b 7/00
U.S. Cl. 117—53       1 Claim

ABSTRACT OF THE DISCLOSURE

Disclosed are techniques for fabricating metal-ceramic articles wherein a hermetic seal is desired between the metal-ceramic jointure. The technique involves utilization of a powdered ceramic containing a binding material which is compressed in a mould around the metal part or parts to be incorporated therein. The green part so formed exhibits superior strength and the article is much easier to handle for subsequent firing. Also disclosed is a glass-ceramic powder composition ideally suited to this process, together with methods for treating the metal parts to insure a hermetic seal.

CROSS-REFERENCE TO RELATED APPLICATION

This application is a division of Ser. No. 761,164, filed Sept. 20, 1968, assigned to the assignee of the present invention.

BACKGROUND OF THE INVENTION

This invention relates to the fabrication of metal-ceramic articles by a powder technique and to a ceramic powder ideally suited for use therewith. More particularly, it relates to methods and apparatus for making integrated circuit (I.C.) packages; to the ceramic used therewith; and to methods of treating the metal parts to be sealed therein.

Packages for I.C. components generally comprise metal-ceramic composite having a ceramic body portion with metallic leads imbedded therein and a metal base which defines a bed for the relatively small component. Inserted in the ceramic body portion are multiple metallic connectors which project into the bed area so that connections to the I.C. component may be made, and extend outwardly from the ceramic body to allow for connection of the package into a circuit.

These packages are currently fabricated by an assembly technique. Ceramic rectangular washers are fabricated and fired to form dense ceramic parts. These parts are placed adjacent to each other and to the metal inserts which will form the leads and the base of the package and are placed in a graphite or similar mould. The mould is placed in a firing chamber and, while being fired, pressure is applied and the ceramic parts are joined together and to the metal parts.

In more detail, present fabrication techniques employ the following steps:

A ceramic powder is formulated generally of a glass frit blended together with alumina and various binders which, when dried, produces a powder which can easily be handled.

These powders are compressed into parts of various shapes and configurations depending upon the type of pack being made. They may be rectangular, round or any other desirable geometric configuration. After the formation the parts are processed through the usual pre-firing step for binder removal and a subsequent firing step to convert the part into a fairly dense ceramic article.

These parts together with the metal frames which will ultimately form the leads and the metal part which forms the base are now placed in a graphite mould containing an upper and lower graphite die and three graphite rectangles, or other geometric shape as noted above—which depend upon the geometric configuration of the pack being formed, are fitted in the various positions within the part being formed. A small weight is placed on one of the graphite parts to supply pressure during the next firing cycle.

This portion of the process depends upon the characteristic of the ceramic material to assume fluid characteristics that flow during heating. The graphite dies with the various parts in position are now fed through a furnace which is heated to the temperature required for the ceramic to assume the fluid state. This portion of the process, therefore, causes the ceramic to flow around the leads of the frame and form a ceramic-metal bond with these leads and the base. When sufficient time has elapsed for this to take place, the part is removed from the furnace and is ready for further processing to make the finished article.

OBJECTS AND SUMMARY OF THE INVENTION

It is an object of the invention to enhance the fabrication of metal-ceramic articles.

It is another object of the invention to reduce the cost of such articles.

It is a further object of the invention to enhance the hermetic seal between the metal-ceramic jointure.

These objects are achieved in one aspect of the invention by formulating a ceramic powder from glass frit and various amounts of alumina as a new composition of matter, blending them together with necessary binders and drying the powder. The powders are placed into a multiple die having various movable and stationary members and the metal frame forming the leads and the base are placed in proper position. A pressing operation is next performed and is carried out at a temperature of about 150 to 180 degrees centigrade and at a pressure of about 4,000 lbs. per square inch, which causes the powders and the metal parts to bond into a single green part. This part has sufficient strength to be handled without fear of breaking. In order to facilitate the bonding between the metal and the ceramic, the metal part is coated with a glass-suspension in a binder before insertion into the die.

The green-formed part is next placed in a furnace and fired, first at a relatively low temperature; that is, about 600° C. for one hour and then moved into a relatively hotter zone; that is, about 950° C. where a final conversion of the powder to a ceramic and the bonding of the ceramic to the metal takes place. After removal from the furnace and necessary cooling, the article is cleaned and other similar operations are performed to complete the handling of the part and it is now ready for use.

DESCRIPTION OF THE PREFERRED EMBODIMENTS

For a better understanding of the present invention, together with other and further objects, advantages and capabilities thereof, reference is made to the following disclosure and appended claim in connection with the above-described drawings.

Figure 1:
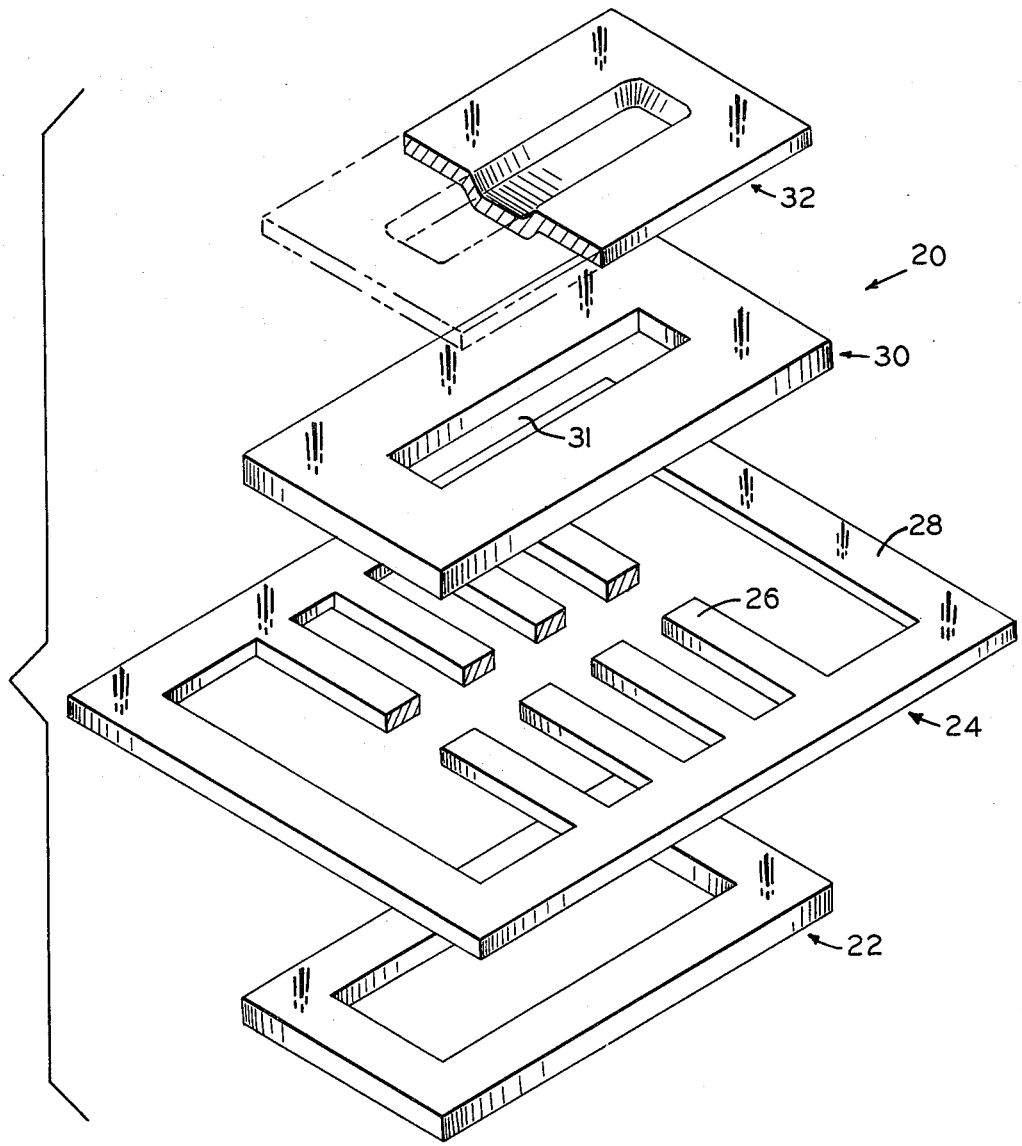
FIG. 1 is an exploded sectional view of a prior art device.

Referring now to the drawings with greater particularity, in FIG. 1 is shown an I.C. packaging device, as made by prior art techniques, designated generally as 20 and which comprises a first ceramic washer 22 having a substantially rectangular configuration. Positioned over the ceramic washer is a lead frame 24 which contains a plurality of inwardly projecting leads 26 only several of which are shown. The leads are maintained in their desired location by attachment to a frame 28 which will subsequently be removed when the package is completed. Placed atop the lead frame 24 is a second ceramic washer 30 which is also substantially rectangular and whose outer configuration matches that of washer 22. The washer 30 defines a smaller opening 31 which will subsequently provide the bed for the I.C. Placed atop washer 30 is a base plate 32 which is also of metal and which has a depression formed therein and which depression conforms to opening 31 in washer 30. This assembly, after all of the parts have been formulated, is completed by stacking together in an appropriate mould and heating as described above, thus forming the completed package.

Figure 2:
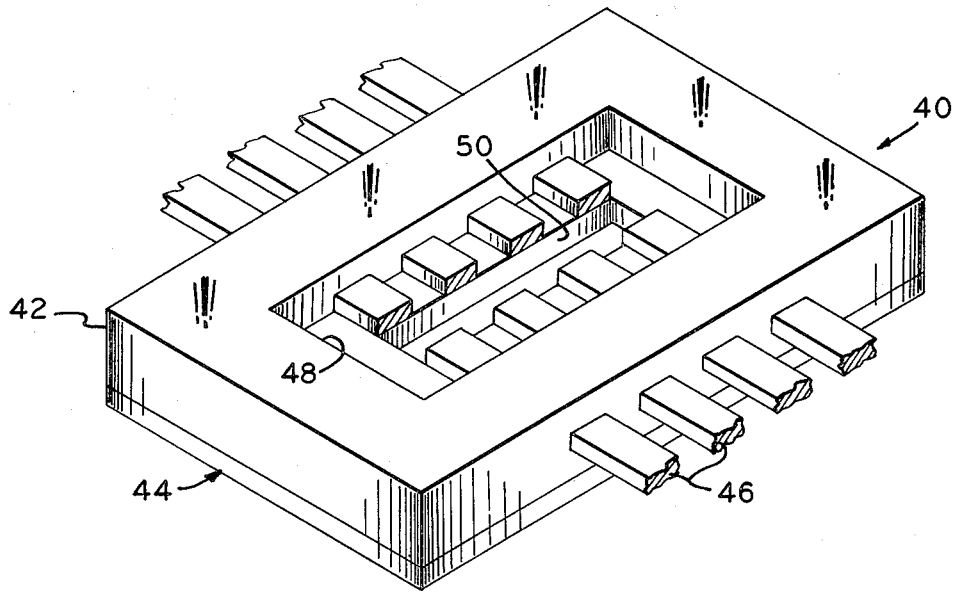
FIG. 2 is a perspective view of the device made in accordance with this invention.
Figure 6:
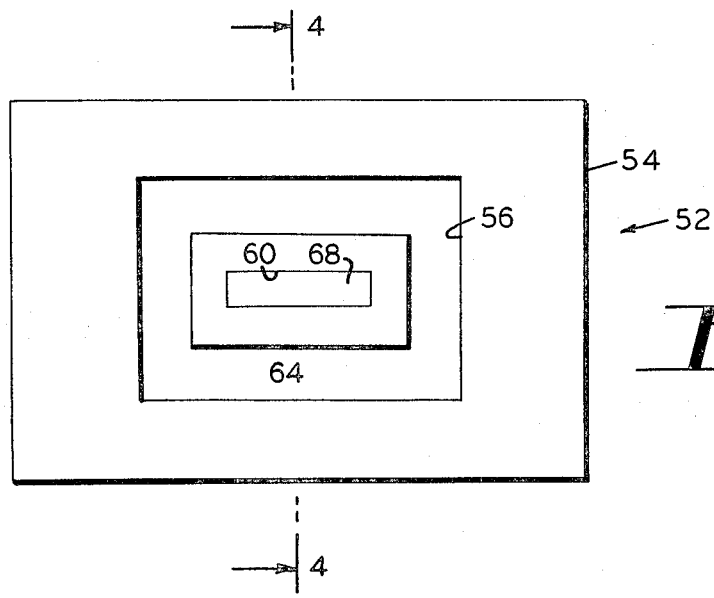
FIG. 6 is a plan view of the mould of FIG. 4.
Figure 5:
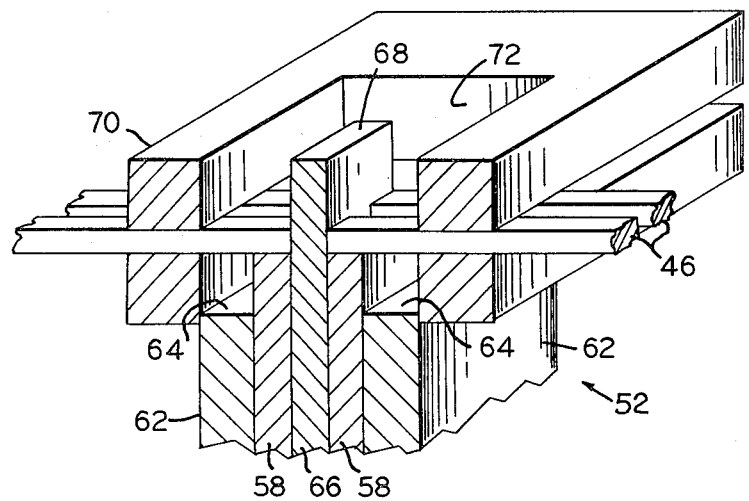
FIG. 5 is a sectional perspective view of the mould in a secondary position.

In FIG. 2 is shown a perspective view of a completed device formed in accordance with the invention to be herein described. It is to be noted that the prior art device of FIG. 1 is shown in an inverted position, that is, with the apertures facing downward, while the device of FIG. 2 is shown with the apertures uppermost. The device shown in FIG. 2 and designated generally as 40 is formed in accordance with the invention and comprises a ceramic body portion 42 which rests upon a metallic base plate 44 of a suitable material such, for example, as Kovar. It is, of course, essential that the metallic members and the ceramic portions have substantially the same thermal coefficient of expansion. Leads 46 are shown projecting from a side wall of the ceramic body 42 and projecting inwardly to a substantially rectangular opening 48. Within opening 48 is a second smaller rectangular opening 50 which actually forms the bed for the I.C. The floor of bed 50 is formed as a protruding portion on the base plate 44. The package 40 is fabricated in four general steps, viz:

(1) Preparation of the metal parts.
(2) Preparation of the powder for the glass-ceramic portion.
(3) Assembly of the metal ceramic package into a green-formed part.
(4) Firing to remove the binder and further firing to completely form the ceramic member and to complete the seal.

The metal parts, which consist of the lead frame with the leads 46 attached and the base 44, may be fabricated in strips or in separate pieces. The parts are prepared by first cleaning with a degreasing agent such, for example, as trichlorethylene. After the cleaning, the part is sandblasted to furnish an etched surface for the glass-ceramic material. After the sandblasting the metal parts are oxidized by heating in an oxidizing atmosphere at a temperature of about 900 to 1,000° C. for about 100 to 110 seconds. After the oxidizing, at least the oxidized portions are coated with a suitable flux to facilitate movement of the glass-ceramic composition therearound during the final steps in forming the seal. The flux comprises a fluid carrier and a suspension contained therein with the carrier comprising, by weight, about 99.64% water, about .11% concentrated hydrochloric acid, and about .25% dodecyl alcohol; and the suspension comprises by weight from 58 to 61% ZnO, from 18 to 21% $B_2O_3$, from 10 to 12% $SiO_2$, from .1 to .2% $Al_2O_3$, from .040 to .070% MgO, from .010 to .020% $Na_2O$, from 4 to 5% polyvinyl alcohol, from 2 to 4% triethylene glycol and from .1 to .22% hydrodyne. The coating of the part may be done by spraying on a layer sufficient to give a gray to white coating on the metal. The coated metal parts are then completely dried in warm air to fix the suspension on the part.

The new powder formulation, that is, the glass-ceramic composition which will form the ceramic body portion, comprises by weight from 34 to 40% $Al_2O_3$, from .5 to 2% BaO, from 12 to 16% ZnO, from 1 to 3% $K_2O$, from 28 to 36% $SiO_2$, from 12 to 18% $B_2O_3$, from .5 to 1.5% $Na_2O$, and from 0 to 2% of oxides selected from the group consisting of MgO, $Li_2O$, SrO, and CaO.

The glass-ceramic composition is prepared by mixing the above ingredients in either a ball mill or "V" type blender depending upon the amount being prepared. The blending takes from four to twelve hours. No balls or other objects are present in the mill or blender as no attrition is required.

After the materials have been blended, a binder material to improve flow characteristics is added. The binder consists of 2.4 grams of polyvinyl alcohol, 1.6 frams triethylene glycol, .41 gram concentrated hydrochloric acid, .1 gram hydrodyne, and 3 to 4 drops of dodecyl alcohol. These ingredients are made up in about a 50 cc. solution of water. The binder material is added to the glass-ceramic composition in an amount to make a 3.5% polyvinyl alcohol addition. The binder addition may be made in any ball mill, blender or similar container to which a few ceramic balls have been added to aid in the mixing process. The binder should be present in an amount sufficient to coat all particles of the glass-ceramic composition. After the mixing of the composition and the addition of the binder, the entire suspension is removed from the mill or blender and spray dried to remove all volatile materials. The resulting powder produced by this method is spherical, free-flowing and dry.

It will be obvious to those skilled in the art that various applications for this ceramic material may require different binders, fluxes and metallic inserts.

Figure 4:
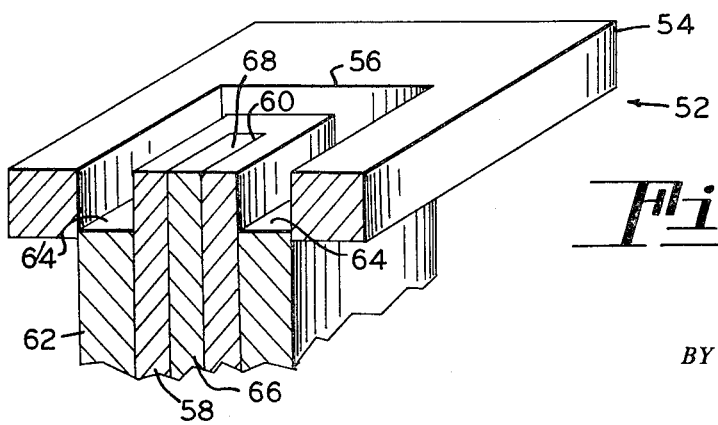
FIG. 4 is a sectional perspective view of a portion of the mould used in fabricating an article in accordance with the invention.

Referring now to FIG. 4, there is shown therein diagrammatically a multiple die in which the green-formed part is fabricated. The die, designated generally as 52, comprises a first stationary die 54 which defines therein a first geometric opening 56, in this instance the opening is shown as being rectangular; however, it is to be noted that any suitable geometric shape may be utilized depending upon circumstances. Positioned substantially symmetrically within the first geometric opening 56 is a smaller second stationary die 58 which also has a substantially rectangular configuration. A substantially symmetrically located second geometric opening 60 is positioned within second stationary die 58. A first movable die 62 having a substantially rectangular washer configuration is positioned between the first and second stationary dies and substantially conforms to the first geometric opening. The upper surface 64 of the first movable die forms the bottom of the rectangular cavity defined by the first geometric opening. Positioned within the second geometric opening 60 and substantially conforming thereto is a second movable die 66. The upper surface 68 of die 66 is aligned with the upper surfaces of first stationary die 54 and second stationary die 62.

Figure 3:
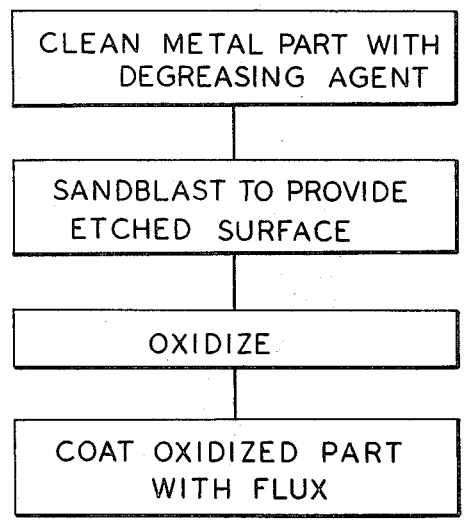
FIG. 3 is a flow diagram of a method of preparing the metal parts to be joined to the ceramic.

To complete the multiple die, a third movable die 70 defining a third geometric opening 72 is provided to overlie the first stationary die 54. Third die 70 is shown in FIG. 3. In the instant figure, the third die is shown as laying upon the leads 46 of a lead-in frame and second movable die 68 is shown in a raised position wherein the upper surface 68 thereof is now planar with the upper surface of third movable die 70. It will be seen that the thickness of second movable die 68 is such as to fit between the innermost ends of leads 46.

Figure 7:
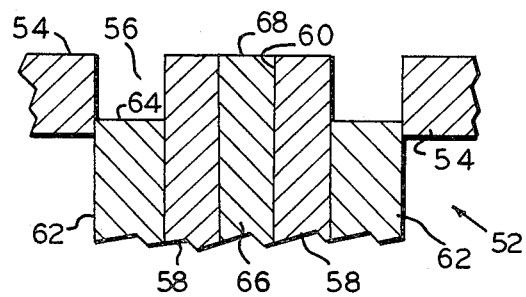
FIGS. 7–18 are diagrammatic sectional views of various stages in the formulation of an article in accordance with this invention.
Figure 8:
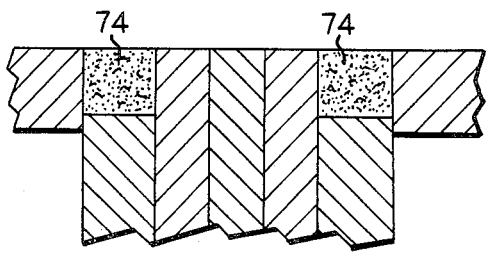
Figure 9:
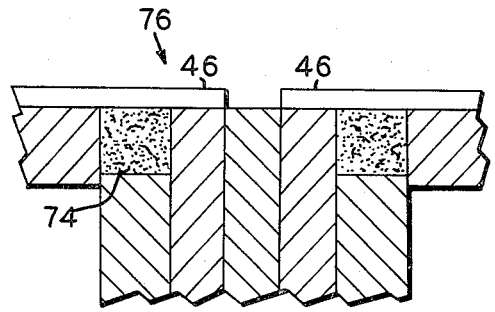
Figure 10:
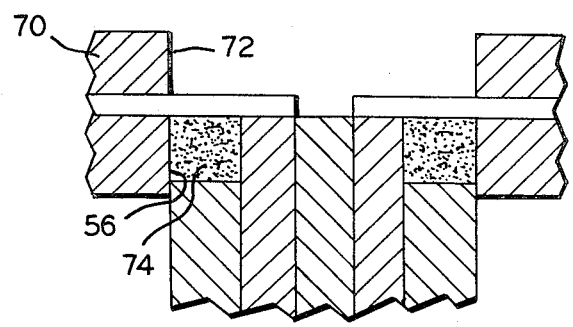
Figure 11:
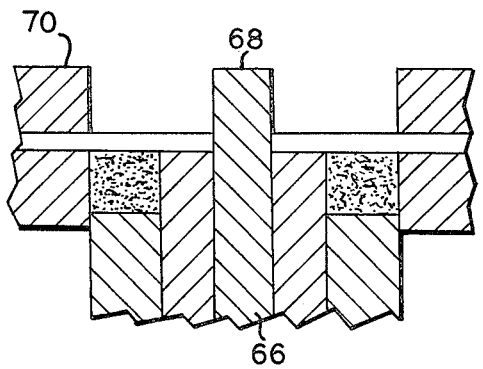
Figure 12:
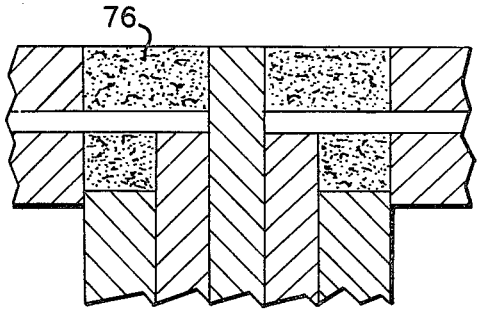
Figure 13:
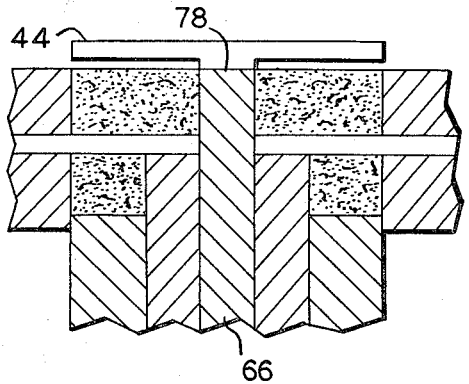
Figure 14:
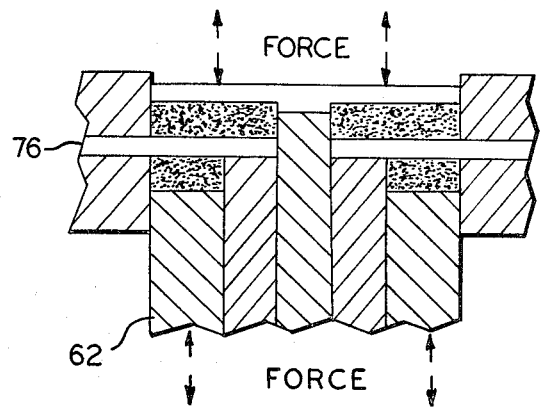
Figure 15:
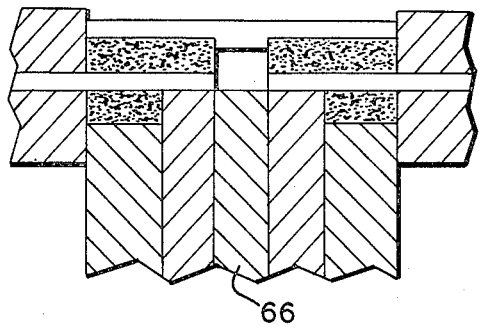
Figure 16:
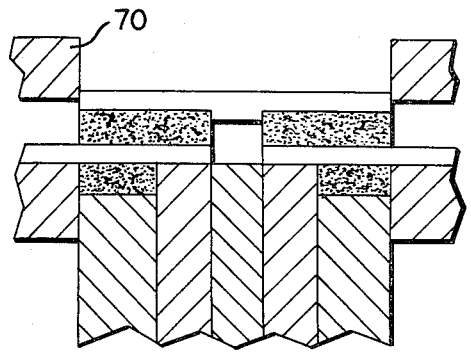
Figure 17:
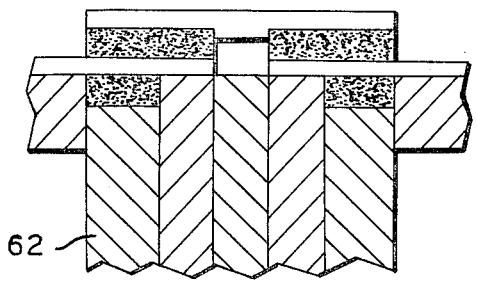
Figure 18:
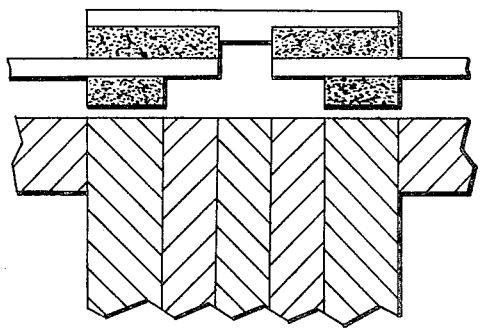

Referring now to FIGS. 7 through 18, there is shown a diagrammatic sequence of the green part forming operation. FIG. 7 shows the position of the stationary and movable members of the die prior to the addition of any ceramic material. With the dies in this position, the first cavity which is formed by the first and second stationary dies and the upper surface of the first movable die 64 is filled with a first quantity of the previously prepared powdered ceramic material 74. The powdered material 74 is leveled off to coincide with the upper surfaces of first and second stationary dies. In FIG. 9 is shown the addition of a first metallic member 76 which comprises the leads 46 and a frame, not shown, but similar to frame 28 of FIG. 1. The inner opening defined by the innermost ends of leads 46 is aligned with the second geometric opening which is formed in second stationary die 58. FIG. 10 shows the addition of third movable die 70 which is positioned on top of the first metallic member 76 and which has its geometric opening 72 aligned with the first geometric opening 56. FIG. 11 shows the next step in the operation which is that of raising second movable die 66 until its upper surface 68 is planar with the upper surface of third movable die 70. FIG. 12 shows the next step which is the filling of the cavity 72 with a second given quantity of ceramic material 76 to the level of the upper surface of the third movable die. The next step in the operation is the addition of a second metallic member which, in this instance, is the base plate 44. The protuberance 78 which is formed on base plate 44 is aligend with the upper surface of second movable die 66. With the proper alignment being maintained, the green part is now formed by the application of a suitable force in two different directions, viz.: downwardly upon the base plate and upwardly by first movable die 62. The force involved is about 4,000 lbs. per square inch. It is to be noted that, to avoid bending or distortion of the first metallic member 76, it is essential that this member define a fixed plane about which the two substantially equal forces are exerted. Further, to achieve a flowing and semibonding of the ceramic material to the metal members, the die at least prior to the application of the force is heated to a temperature of about 150 to 180° C. After the force has been applied and the compression of the ceramic powder has taken place, the second movable die 66 is withdrawn to its first position as shown in FIG. 15, and the third movable die is removed. After the removal of the third movable die, first movable die 62 is raised to push the completed green-formed article from the mould as shown in FIG. 18.

The green-formed part may now be stored or sent to final processing since it is found to have exceptional strength characteristics. For the final processing, the green-formed part is fired in a two-step operation. The first step is a firing in air at a temperature of about 600° C. for about one hour. The first firing step assures the completion of binder removal. The second step is a firing for about 20 minutes at a temperature of 900 to 975° C. The second firing is done in an inert atmosphere, for example, nitrogen. After the final firing, the part is cleaned and it is ready for the insertion and wiring of an I.C. component.

An exact understanding of the mechanics of the firing operation is not completely understood at this time. During the firing cycle, it is or would be expected that the part would shrink and that cracking or distortion of the frame would occur. While some shrinkage of the material does occur, there is no cracking or distortion present. It appears that, during the period of change in physical size, the ceramic material actually moves along the metal frame without breaking the seal. When both parts are at the elevated temperature, that is, in the 900 to 975° C. range, the change in physical size seems to have been completed and the parts cool with the same coefficient of expansion. This in turn forms an article which meets all of the necessary size, shape, and hermeticity requirements of an I.C. package.

Thus, it will be seen that there has been provided a new and novel method for fabricating metal-ceramic composite articles. With particular application to I.C. packages, the fabrication is greatly enhanced. Many unnecessary firing steps are eliminated and thus the cost is greatly reduced from the prior art methods of manufacture. A green part is formed which has exceptional strength characteristics and which may be handled and stored prior to the final firing operations.

While there have been shown and described what are at present considered the preferred embodiments of the invention, it will be obvious to those skilled in the art that various changes and modifications may be made therein without departing from the scope of the invention as defined by the appended claim.

I claim:

1. The method of preparing a metal part, which consists of by weight, 29% nickel, 17% cobalt and the balance iron, to be sealed with a powdered glass-ceramic composition of matter which consists essentially of, by weight, from 34 to 40% $Al_2O_3$, from .5 to 2% BaO, from 12 to 16% ZnO, from 1 to 3% $K_2O$, from 28 to 36% $SiO_2$, from 12 to 18% $B_2O_3$, from .5 to 1.5% $Na_2O$, and from 0 to 2% of oxides selected from the group consisting of MgO, $Li_2O$, SrO and CaO, said method comprising the steps of: cleaning at least those portions of said metal part to be encompassed within said seal with a degreasing agent; sandblasting at least those same portions to furnish an etched surface to said seal; oxidizing at least said sandblasted portions in an oxidizing atmosphere at a temperature of between 900 and 1000° C. for about 100 to 110 seconds; and coating at least said oxidized portions with a suitable flux to facilitate movement of said composition therearound during the final steps in forming said seal, said flux comprising: a fluid carrier and a suspension contained therein, said carrier comprising by weight: about 99.64% water; about .11% concentrated hydrochloric acid; and about .25% dodecyl alcohol; and said suspension comprising by weight; from 58 to 61% ZnO; from 18 to 21% $B_2O_3$; from 10 to 12% $SiO_2$; from .1 to .2% $Al_2O_3$; from .040 to .070 MgO; from .010 to .020% $Na_2O$; from 4 to 5% polyvinyl alcohol; from 2 to 4% triethylene glycol; and from .1 to .22% hydrodyne.

References Cited

UNITED STATES PATENTS

| | | | |
|---|---|---|---|
| 3,220,815 | 11/1965 | McMillan et al. | 65—43 X |
| 2,647,070 | 7/1953 | Litton | 65—43 X |
| 2,974,051 | 3/1961 | Moore | 106—48 |
| 2,584,354 | 2/1952 | Kissinger et al. | 148—6.35 X |
| 2,872,724 | 2/1959 | Conant | 148—6.35 X |
| 3,519,496 | 7/1970 | Finn et al. | 148—6.35 |
| 3,222,775 | 12/1965 | Whitney | 65—43 X |

RALPH S. KENDALL, Primary Examiner

C. WESTON, Assistant Examiner

U.S. Cl. X.R.

65—43; 106—48; 117—70 C, 129; 148—6.3; 161—196